United States Patent
Steeby

[19]

[11] Patent Number: 5,940,786
[45] Date of Patent: Aug. 17, 1999

[54] TEMPERATURE REGULATED CLOCK RATE FOR MICROPROCESSORS

[75] Inventor: Jon Steeby, Schoolcraft, Mich.

[73] Assignee: Eaton Corporation, Cleveland, Ohio

[21] Appl. No.: 08/755,239

[22] Filed: Nov. 22, 1996

[51] Int. Cl.$^6$ ................................................. G05D 23/00
[52] U.S. Cl. ........................... 702/132; 713/322; 327/378; 340/501
[58] Field of Search .................... 364/557, 550, 364/148, 152, 130; 395/750.01, 750.02, 750.03, 750.04, 555, 556, 557, 559, 560; 323/907; 326/32; 327/83, 138, 262, 378, 517; 374/210; 330/289; 334/5; 340/501; 331/176; 257/712; 702/130, 132; 713/300, 322

[56] References Cited

U.S. PATENT DOCUMENTS

| | | | |
|---|---|---|---|
| 4,689,659 | 8/1987 | Watanabe | 357/81 |
| 5,132,632 | 7/1992 | Russel et al. | 328/16 |
| 5,287,292 | 2/1994 | Kenny et al. | 364/550 |
| 5,291,607 | 3/1994 | Ristic et al. | 395/750 |
| 5,418,751 | 5/1995 | Kaiser | 365/211 |
| 5,422,806 | 6/1995 | Chen et al. | 364/149 |
| 5,422,832 | 6/1995 | Moyal | 364/557 |
| 5,481,210 | 1/1996 | Genzel | 326/93 |
| 5,483,102 | 1/1996 | Neal et al. | 257/712 |
| 5,500,509 | 3/1996 | Vogt | 219/501 |
| 5,502,838 | 3/1996 | Kikinis et al. | 395/550 |
| 5,639,163 | 6/1997 | Davidson et al. | 374/178 |
| 5,644,271 | 7/1997 | Mollov et al. | 331/176 |
| 5,721,837 | 2/1998 | Kikinis et al. | 395/281 |

FOREIGN PATENT DOCUMENTS

0683558A1  11/1995  European Pat. Off. ......... H02H 5/04

OTHER PUBLICATIONS

Merchant et al., "Analysis of a Control Mechanism for a Variable Speed Processor", IEEE Transactions on Computers, Jul. 1996.

Cox et al., "VLSI Performance Compensation for Off–Chip Drivers and Clock Generation", IEEE Custom Integrated Circuits Conf., Jun. 1989.

Primary Examiner—John Barlow
Assistant Examiner—Patrick J. Assouad
Attorney, Agent, or Firm—Brooks & Kushman PC

[57] ABSTRACT

A system and method for regulating temperature of a microprocessor include an oscillator having a frequency which varies based on temperature of the microprocessor wherein the oscillator is connected to the clock input of the microprocessor. The system and method allow operation of the microprocessor at reduced clock frequencies in an attempt to reduce heat generation and stabilize the microprocessor temperature prior to occurrence of a permanent failure due to an operation at excessive temperature.

7 Claims, 3 Drawing Sheets

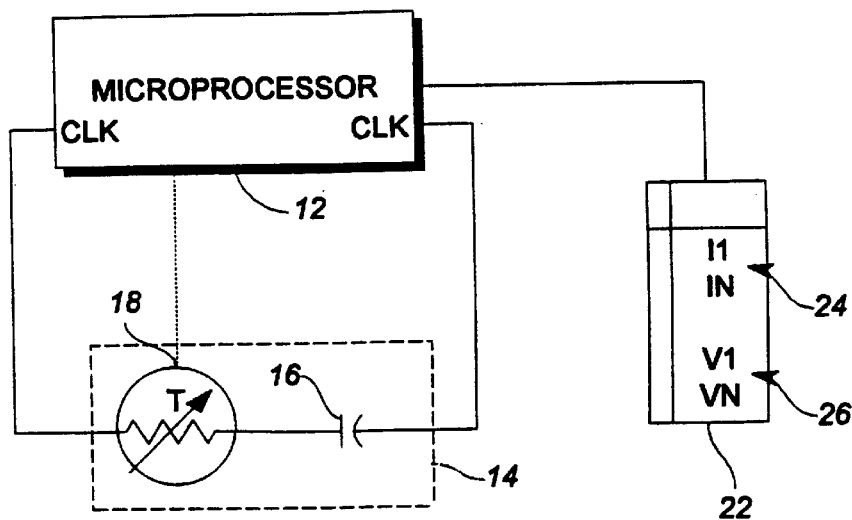
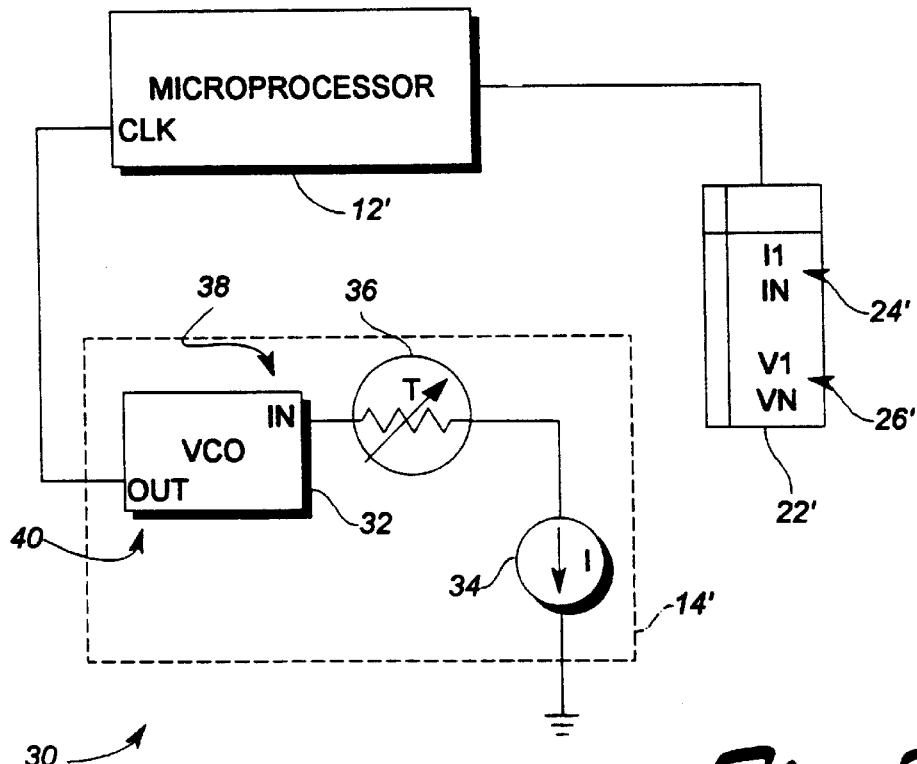
Fig. 1
Fig. 2

TEMPERATURE REGULATED CLOCK RATE FOR MICROPROCESSORS

TECHNICAL FIELD

The present invention is related to a system and method for controlling or regulating temperature of a microprocessor by varying the clock rate.

BACKGROUND ART

The continuing evolution of microprocessors has made them economically feasible for a variety of applications varying greatly in complexity. Embedded microprocessors and microcontrollers have become ubiquitous due to their flexibility in design and computational power in control. As microprocessors continue to evolve, clock speeds, throughput, and associated power dissipation continue to increase.

Advances in technology have enabled more and more devices to be placed on a single substrate. However, as packing factors increase, each design must provide for heat dissipation due to the considerable heat generated by active devices. In this regard, low voltage microprocessors have been developed to reduce heat generation. For many applications, passive heat dissipation is not sufficient, even though low voltage devices are utilized.

In addition to the heat generated by the microprocessor and other active components, many applications subject the microprocessor and its associated components to a wide range of ambient operating temperatures. For example, microprocessors used in vehicular applications are often mounted in regions of the vehicle which experience a wide range of operating temperatures. Microprocessors may be mounted on the engine, in the transmission, in the passenger cabin, and the like. These microprocessors require a robust design to assure reliability and durability throughout the life of the vehicle while continually being subjected to temperature swings which may range from below −50° C. to above 100° C., for example. As such, the ambient temperature of the microprocessor may adversely affect its operation if not properly designed.

In general, as temperature increases, the channel resistance of a typical MOSFET device will also increase, which may lead to thermal runaway. Operation of these devices at excessive junction temperatures will ultimately lead to an intermittent or permanent failure.

SUMMARY OF THE INVENTION

It is thus an object of the present invention to provide a system and method for regulating temperature of a microprocessor.

It is a further object of the present invention to provide a system and method for regulating clock speed of a microprocessor to regulate heat generation.

Yet another object of the present invention to provide a system and method for controlling clock speed of a microprocessor in response to temperature of the microprocessor.

In carrying out the above objects and other objects and features of the present invention, a system is provided for generating an output signal in response to an input signal which includes a microprocessor in communication with a memory having stored program instructions. The microprocessor executes at least a portion of the stored program instructions during each of a plurality of clock cycles to generate the output signal in response to the input signal. The system also includes an oscillator in communication with the microprocessor. The oscillator has a frequency which varies based on temperature of the microprocessor. The frequency of the clock cycles is determined by the frequency of the oscillator.

In one embodiment, the oscillator comprises a voltage controlled oscillator having an input voltage based on the temperature of the microprocessor.

In another embodiment, the oscillator comprises a capacitor connected in series with a thermistor. The capacitor and thermistor are connected across the clock terminals of the microprocessor.

A method is also provided for regulating temperature of a microprocessor executing a plurality of program instructions during a plurality of clock cycles. The method includes determining temperature of the microprocessor and varying frequency of the plurality of clock cycles based on the determined temperature of the microprocessor to maintain the temperature of the microprocessor within an acceptable operating range.

In one embodiment, the frequency of the plurality of clock cycles is increased as the temperature of the microprocessor decreases below a predetermined temperature threshold.

In another embodiment, the frequency of the clock cycles decreases as the temperature of the microprocessor increases beyond another predetermined temperature threshold.

Yet another embodiment combines the above-described features such that the frequency of the clock cycles increases when the temperature of the microprocessor is less than its intended operating range, maintains a substantially constant frequency when the temperature of the microprocessor is within the intended operating range, and decreases when the temperature of the microprocessor exceeds the intended operating range.

The advantages accruing to the present invention are numerous. For example, the present invention allows specification of a microprocessor having a lower rated temperature range in applications where excessive temperatures may be experienced only infrequently. The present invention also provides a built-in protection from failure due to operation at excessively high temperatures: The present invention also allows a temporary increase in microprocessor speed during sections of program code requiring extensive calculations to prevent loop overrun faults which may trigger a watchdog timer reset.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a block diagram illustrating a system for regulating microprocessor temperature according to the present invention;

FIG. 2 is a block diagram of an alternative embodiment using a voltage controlled oscillator according to the present invention;

BEST MODE FOR CARRYING OUT THE INVENTION

Figure 3:
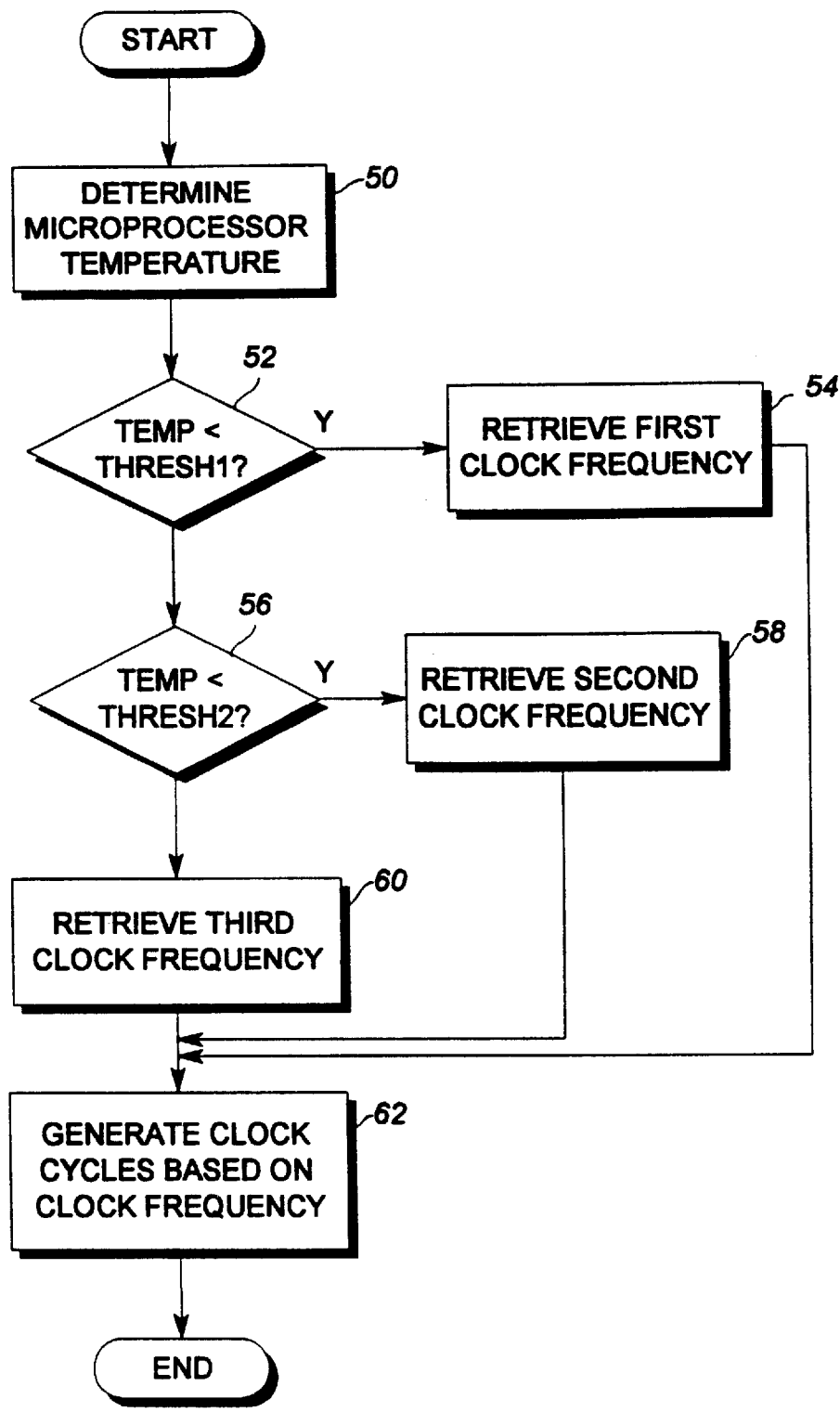
FIG. 3 is a flow diagram illustrating a system or method of controlling microprocessor temperature according to the present invention.

Referring now to FIG. 1, a block diagram illustrating a system for generating an output signal in response to an input signal is shown according to the present invention. The system, indicated generally by reference numeral 10, includes a microprocessor 12 for executing at least a portion of stored program instructions during each of a plurality of clock cycles to generate an output signal in response to an input signal. An oscillator 14 is operatively associated with microprocessor 12. Oscillator 14 has a frequency which varies based on temperature of the microprocessor which then determines the frequency of the clock cycles. Oscillator 14 includes a capacitor 16 connected in series to a positive temperature coefficient device, such as thermistor 18. System 10 also includes a memory 22 having stored program instructions, indicated generally by reference numeral 24. Memory 22 may also include various values ($V_1$–$V_n$) which define a temperature-frequency relationship for the microprocessor clock as explained in greater detail below.

In operation, a positive temperature coefficient (PTC) device, such as thermistor 18, has a resistance which varies with temperature. Preferably, the resistance remains substantially constant over the intended operating temperature range of microprocessor 12, and increases as temperature increases beyond the intended operating range. Applying a voltage (current) across clock (CLK) terminals of microprocessor 12 energizes oscillator 14 which has a frequency that varies based on the varying resistance of PTC device 18. As such, the time constant of oscillator 14 increases such that the oscillator frequency decreases with increasing temperature. Microprocessor 12 determines clock frequency based on frequency of oscillator 14. As such, as the temperature of microprocessor 12 increases, clock frequency is decreased in an attempt to stabilize the temperature of the microprocessor so that continued operation is possible. The clock frequency may be decreased to a point where operation of microprocessor 12 is suspended until the temperature decreases to an acceptable operating point to prevent permanent damage to microprocessor 12.

The particular temperature points which trigger a change in the frequency of oscillator 14, and a corresponding change in the clock frequency of microprocessor 12, vary with the particular application. System 10 may also be used to increase the frequency of oscillator 14 and the associated clock frequency of microprocessor 12 if the temperature of microprocessor 12 is significantly lower than the rated operating temperature.

Referring now to FIG. 2, a block diagram illustrating an alternative embodiment of a microprocessor-based system according to the present invention is shown. In this embodiment, oscillator 14' includes a voltage controlled oscillator 32 in communication with a substantially constant current source 34 connected in series with a positive temperature coefficient device, such as thermistor 36. Current source 34 and PTC device 36 are connected to input 38 of the voltage controlled oscillator (VCO) 32 to provide a voltage which varies based on temperature of thermistor 36. In response, VCO 32 generates a signal on output 40 which is connected to the clock (CLK) input of microprocessor 12'. Of course, current source 34 and PTC device 36 may be integrated with VCO 32. System 30 also includes a memory 22' having stored instructions 24' and values 26' which may be used by microprocessor 12' to further control the clock frequency. For example, values 26' may be used in a prescaler to divide the input clock frequency.

Preferably, oscillator 14' (and likewise oscillator 14 of FIG. 1) is located in close proximity to the associated microprocessor such that the PTC device accurately reflects the temperature of the microprocessor. Depending upon the particular type of oscillator, the oscillator may reside on the same substrate as the microprocessor and other related components.

Referring now to FIG. 3, a flow diagram illustrating operation of a system or method for regulating microprocessor temperature according to the present invention is shown. The control logic represented in the flow diagram may be implemented in hardware, software, or a combination of hardware and software. One of ordinary skill in the art will recognize that various steps may be performed simultaneously, omitted, or other steps may be substituted while accomplishing the objects and achieving the advantages of the present invention.

Block 50 represents determination of the microprocessor temperature. This may be performed intrinsically by a device such as a silicon-based PTC device, as illustrated and described with reference to FIGS. 1 and 2. Alternatively, a digital or analog sensor may be used to determine the current operating temperature of the microprocessor. The current temperature of the microprocessor, as determined by block 50, is compared to a first temperature threshold at block 52 to determine whether the microprocessor is within an acceptable operating range. When block 52 determines that the current temperature is below the first temperature threshold, i.e., the microprocessor is operating in a first temperature range, a corresponding first clock frequency is retrieved, as indicated by block 54. The clock frequency may be stored in a memory, such as memories 24 or 24'. Alternatively, block 54 may represent the switching of a resistor in an RC network to provide a first time constant and corresponding first clock frequency.

If the current operating temperature is greater than or equal to the first temperature threshold, control proceeds with block 56 which determines whether the temperature of the microprocessor is less than a second temperature threshold. When the microprocessor temperature is between the first and second temperature thresholds, block 58 retrieves a second clock frequency. Depending upon the particular application, the second clock frequency may be less than, greater than, or equal to the first clock frequency. When the temperature of the microprocessor, as determined by block 50, is greater than the second temperature threshold, a third clock frequency is retrieved, as indicated by block 60. Block 62 then generates clock cycles based on the clock frequency. For example, clock 62 may convert a sinusoidal or other waveform into a generally rectangular waveform to be used by the digital logic associated with the microprocessor. The frequency of the clock cycles may vary based on the input frequency applied to the clock terminals of the microprocessor.

Figure 4A:
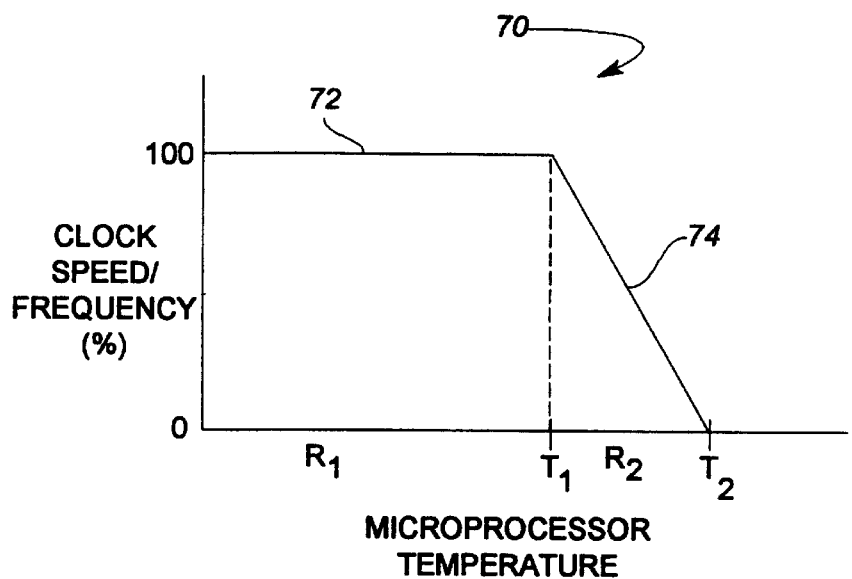
FIG. 4A is a graphical representation of the relationship between microprocessor temperature and clock speed or frequency according to the present invention.
Figure 4B:
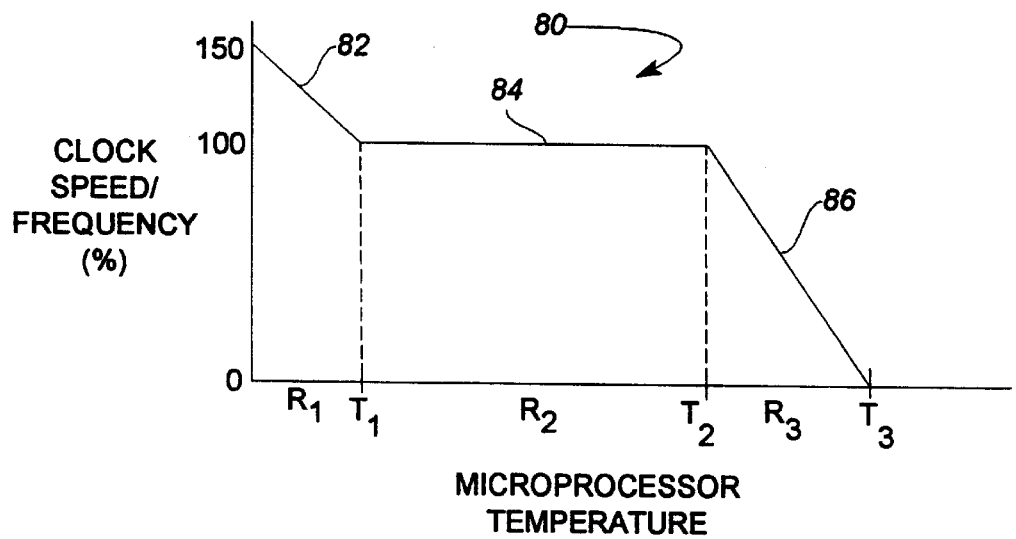
FIG. 4B is a graphical representation of an alternative embodiment illustrating the relationship between clock speed (frequency) and microprocessor temperature according to the present invention.

FIGS. 4A and 4B graphically depict two operating curves for controlling microprocessor temperature according to the present invention. Regulation curve 70 generally defines the clock speed or frequency as a percentage of the rated clock speed for a particular microprocessor as a function of the microprocessor temperature. As such, segment 72 represents operation at 100% of the rated clock speed over the acceptable or rated temperature range $R_1$. Temperature range $R_1$ includes microprocessor temperatures up to a first temperature threshold $T_1$. As the temperature varies between 0 and $T_1$, the clock speed remains substantially constant, as indicated by line segment 72. The clock speed is proportionally decreased in range $R_2$ between temperatures $T_1$ and $T_2$. Microprocessor operation is suspended above the second temperature threshold $T_2$ to prevent permanent damage to the microprocessor.

Operation in range $R_2$ may provide a "limp home" function where only critical operations are performed, or operations are performed less frequently due to the slower clock speed. Operation in this range may be indicated by generation of an output signal as described with reference to FIGS. 1 and 2.

FIG. 4B illustrates an alternative temperature regulation curve 80 defining temperature ranges $R_1$, $R_2$, and $R_3$. Microprocessor clock speed may be increased during operation in temperature range $R_1$ which would normally be below the rated temperature of the microprocessor. For example, temperature range $R_1$ may span 100° C. to −50° C. As the microprocessor temperature increases, the clock speed or frequency decreases until the temperature reaches a first threshold $T_1$. The clock speed remains substantially constant as indicated by segment 84 between microprocessor temperature $T_1$ and microprocessor temperature $T_2$ corresponding to temperature range $R_2$. This temperature range corresponds to the normal, acceptable operating range of the microprocessor which may span −50° C. to 100° C., for example. Once the temperature of the microprocessor exceeds the second temperature threshold $T_2$, the clock frequency is reduced, as indicated by line segment 86, until operation is suspended at temperature $T_3$. Operation 14 and temperature range $R_3$, extending between temperature threshold $T_2$ and $T_3$, provides a more limited operation which may be used in a fault recovery or "limp home" mode as described above.

Increased frequency operation of the microprocessor may also be used temporarily provided the temperature of the microprocessor is below a predetermined critical temperature. For example, a temporary increase in microprocessor clock speed may be used for sections of program code which require complex calculations or operations to avoid a loop overrun and associated watchdog timer reset. Clock speed is then returned to 100% of rated speed after the code section (procedure or routine) is completed.

Thus, the present invention provides a system and method for regulating microprocessor temperature by varying clock speed of the microprocessor based on the microprocessor temperature.

While the best mode for carrying out the invention has been described in detail, those familiar with the art to which this invention relates will recognize various alternative designs and embodiments for practicing the invention as defined by the following claims.

What is claimed is:

1. A system for generating an output signal in response to an input signal, the system comprising:
    a microprocessor in communication with a memory having stored program instructions, the microprocessor executing at least a portion of the stored program instructions during each of a plurality of clock cycles to generate the output signal in response to the input signal; and
    an oscillator in communication with the microprocessor, the oscillator having a frequency which varies based on temperature of the microprocessor, wherein frequency of the plurality of clock cycles is determined by frequency of the oscillator and wherein the oscillator comprises a current source for providing a substantially constant supply of current, a positive temperature coefficient device in series with the current source, and a voltage controlled oscillator having an input connected across the positive temperature coefficient device.

2. The system of claim 1 wherein the voltage controlled oscillator receives an input voltage based on the temperature of the microprocessor.

3. A system for generating an output signal in response to an input signal, the system comprising:
    a microprocessor in communication with a memory having stored program instructions, the microprocessor capable of executing at least a portion of the stored program instructions during each of a plurality of clock cycles to generate the output signal in response to the input signal; and
    an oscillator comprising
    a capacitor and a thermistor connected in series with the capacitor, the oscillator being in communication with the microprocessor and having a frequency which varies based on temperature of the microprocessor.

4. The system of claim 3 wherein the thermistor comprises a silicon-based thermistor having a positive temperature coefficient.

5. The system of claim 1 wherein the oscillator and the microprocessor reside on a single integrated circuit.

6. The system of claim 1 wherein the memory comprises at least one program instruction executed by the microprocessor operative to vary the frequency of the plurality of clock cycles based on the temperature of the microprocessor.

7. The system of claim 1 wherein the oscillator has a frequency defined by:
    a decreasing function of temperature within a first temperature range;
    a substantially constant function of temperature within a second temperature range; and
    a decreasing function of temperature within a third temperature range.

* * * * *